United States Patent [19]

McClure

[11] Patent Number: 4,634,147
[45] Date of Patent: Jan. 6, 1987

[54] REDEEMABLE COUPON

[75] Inventor: Murray C. McClure, Markham, Canada

[73] Assignee: Common Market Investment Ltd., Bermuda, Bermuda

[21] Appl. No.: 588,205

[22] Filed: Mar. 12, 1984

[30] Foreign Application Priority Data

Mar. 6, 1984 [CA] Canada ................................ 448990

[51] Int. Cl.⁴ ...................... G09F 19/00; G06G 1/02
[52] U.S. Cl. .................................... 283/56; 235/70 R
[58] Field of Search ............. 283/17, 51, 56; 229/70; 235/70 R

[56] References Cited

U.S. PATENT DOCUMENTS

| 1,132,641 | 3/1915 | Wainwright et al. | 283/56 |
| 2,299,698 | 9/1961 | Hoese | 283/56 |
| 3,290,812 | 12/1966 | Hunkins | 283/56 |
| 3,582,111 | 6/1971 | Siiter | 283/56 |
| 3,711,683 | 1/1973 | Hamisch, Jr. | 283/56 |
| 3,762,628 | 10/1973 | Sargent | 229/70 |
| 4,010,964 | 3/1977 | Schechter | 283/56 |
| 4,011,985 | 3/1977 | Simson | 283/56 |
| 4,262,939 | 4/1981 | Schoettle, Jr. | 235/70 R |
| 4,307,900 | 12/1981 | Krautsack | 283/56 |

FOREIGN PATENT DOCUMENTS

| 0105760 | 4/1984 | European Pat. Off. | |
| 617815 | 2/1961 | Italy | 281/31 |
| 2130527 | 6/1984 | United Kingdom | |

Primary Examiner—Paul A. Bell
Assistant Examiner—Paul M. Heyrana, Sr.
Attorney, Agent, or Firm—Brant Latham

[57] ABSTRACT

A refund coupon redeemable at a cash value at retail stores when a proof-of-purchase comprising a portion of a given product's packing packaging is affixed to the coupon. The coupon includes coupon indemnification indicia thereof corresponding to product identification indicia on the product and location indicia means indicating a location on the coupon for affixation of a portion of the product's packaging carrying the product identification code. The coupon identification indicia and the location indicia are positioned on the coupon proximate each other to facilitate a visual comparison of the coupon identification indicia and the product identification indicia affixed to the coupon.

3 Claims, 11 Drawing Figures $ 1.00 REFUND IF A PROOF OF PURCHASE U.P.C. CODE FROM 10oz BRAND X COFFEE IS AFFIXED Affix proof of purchase U.P.C. code here 55900 02152

1. cut proof of purchase from package.
2. lift and fold back flap.
3. Insert proof of purchase under flap
4. press flap down on to proof of purchase

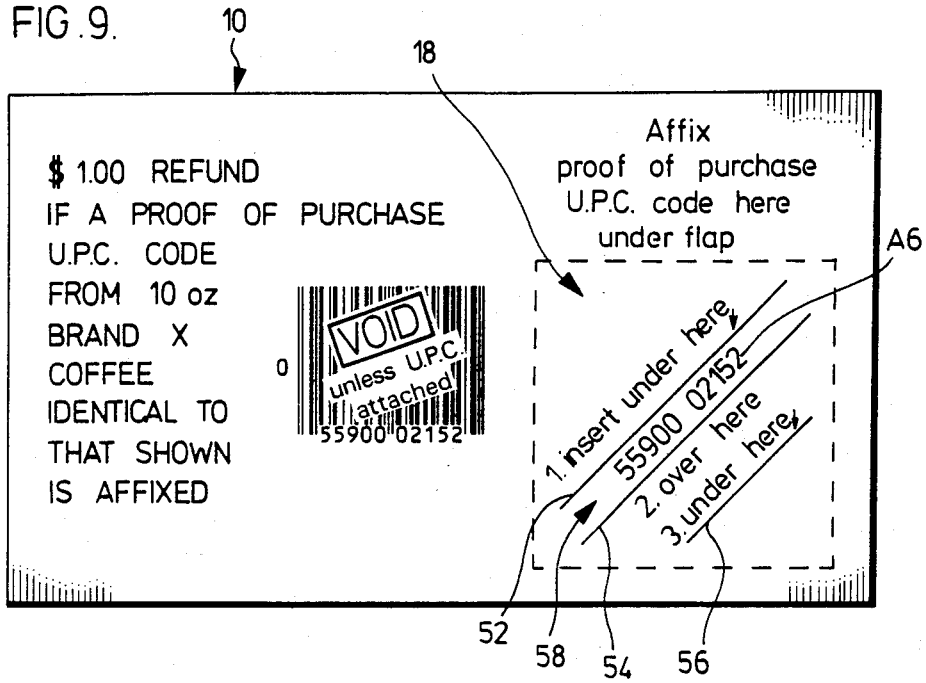
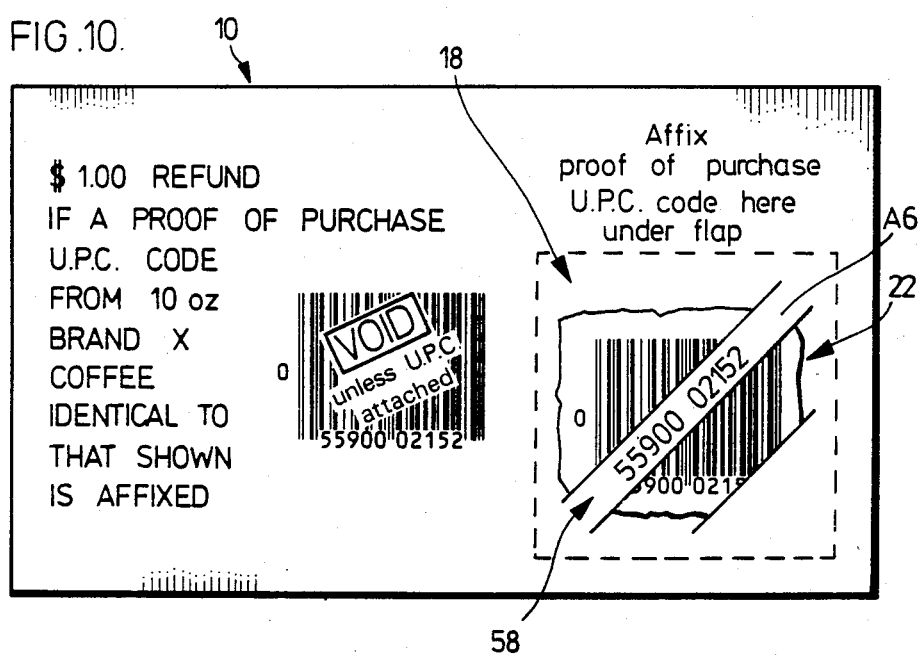

REDEEMABLE COUPON

BACKGROUND OF THE INVENTION

This invention relates to promotion and marketing techniques for retail products and more particularly to a promotional refund coupon redeemable at retail stores upon proof of purchase of a given retail product.

In the past it has been well known to offer discount coupons which upon the purchase of a given product at a retail store entitle the purchaser to a discount from the purchase price. An object of such discount coupons is to stimulate sales by enducing consumers to purchase specific products particularly newly introduced products. Critical to utilization of such coupons as a marketing tool is the ability to measure their effect on sales. Recently, coupon redeemers have adopted a policy of redeeming coupons regardless of proof-of-purchase. This action has made the traditional discount coupon of very little use as a marketing tool because the effect on sales due to the coupons cannot be measured.

Another well known marketing tool to induce sales is to offer cash refunds upon presentation of proof-of-purchase. In order to use refund schemes as a marketing tool, it is essential that verification be made that the tendered proof-of-purchase actually evidences a sale. Mail-in-refund schemes in which the consumer-purchaser returns by mail a proof-of-purchase, followed by mailing of a refund, permits the proof-of-purchase to be easily verified by the few personnel at a mail house who becomes so familiar with the product so as to instantly recognize satisfactory evidence of actual product purchase. However, given the necessary labour involved to handle such mail and send out suitable refunds, mail-in-refund schemes are expensive.

SUMMARY OF THE INVENTION

Accordingly, it is an object of the present invention to at least partially overcome these disadvantages by providing a refund scheme which is redeemable for a refund at a retail store upon affixing thereto a proof-of-purchase, which coupon is provided with information thereon facilitating visual verification that a suitable proof of purchase has been tendered.

Another object of this invention is to provide means on the coupon whereby proof-of-purchase may be quickly verified as satisfactory.

Another object is to provide a method of providing a refund in retail stores which retail stores would find acceptable having regard to the time required by a cashier in ascertaining that the refund coupon has properly been validated by presentation of a proof-of-purchase.

Another object is to provide a coupon including means not only permitting a tendered proof-of-purchase to be quickly, visually verified as satisfactory but also including means whereby the tendered proof-of-purchase becomes substantially permanently coupled to the coupon.

To this end, in one of its aspects, the present invention provides a refund coupon redeemable at a cash value at retail stores when a proof-of-purchase comprising a portion of a given product's packaging is affixed thereto, the coupon comprising in combination:

(a) coupon identification indicia thereon corresponding to product identification indicia provided on packaging of a given product; and (b) location indicia means thereon indicating a location on the coupon for affixation of a portion of the product's package carrying said product identification indicia, the coupon identification indicia and the location indicia being positioned on the coupon proximate each other to facilitate a visual comparison of the coupon identification indicia and the product identification indicia on a portion of a product packaging affixed on said location.

In another of its aspects, the present invention provides a method for manufacturing and using a refund coupon redeemable at a cash value at retail stores when a proof of purchase comprising a portion of a product's packaging is affixed thereto, the method comprising the steps of:

(a) printing product identification indicia on packaging to be associated with a given product, (b) printing coupons with coupon identification indicia thereon corresponding to said product identification indicia and with location indicia thereon indicating a location on the coupon for affixation of a portion of a product packaging containing said product identification indicia, (c) providing means for fixedly mounting a portion of a product packaging onto said coupon on said location, (d) distributing the product and its associated packaging, (e) distributing the coupons, (f) redeeming the discount coupon at retail stores upon verification that the coupon has been activated by affixation of a portion of a products packaging containing a product identification indicia corresponding to the coupon identification indicia.

BRIEF DESCRIPTION OF THE DRAWINGS

Further objects and advantages of the invention will appear from the following description and taken together with the accompanying drawings in which:

FIG. 9 is a plan view of a refund coupon in accordance with a sixth embodiment of the present invention;

FIG. 10 is a plan view of the coupon of FIG. 9 with a proof-of-purchase attached.

DETAILED DESCRIPTION OF THE PREFERRED EMBODIMENTS

A major percentage of retail products marketed in North America are marked with a Universal Product Code (hereinafter referred to as UPC). The UPC comprises a number which identifies a particular product. The UPC code is depicted on a product in two forms, firstly in ordinary numerical characters and secondly as a plurality of suitably spaced parallel lines readable, for example, by a computer assisted optical reader.

The invention of the present application involves a consumer, after purchasing a designated product, suitably detaching a portion of the products packaging from the remainder of the package so that the detached portion of the package may comprise a proof of purchase of the product.

Figure 1:
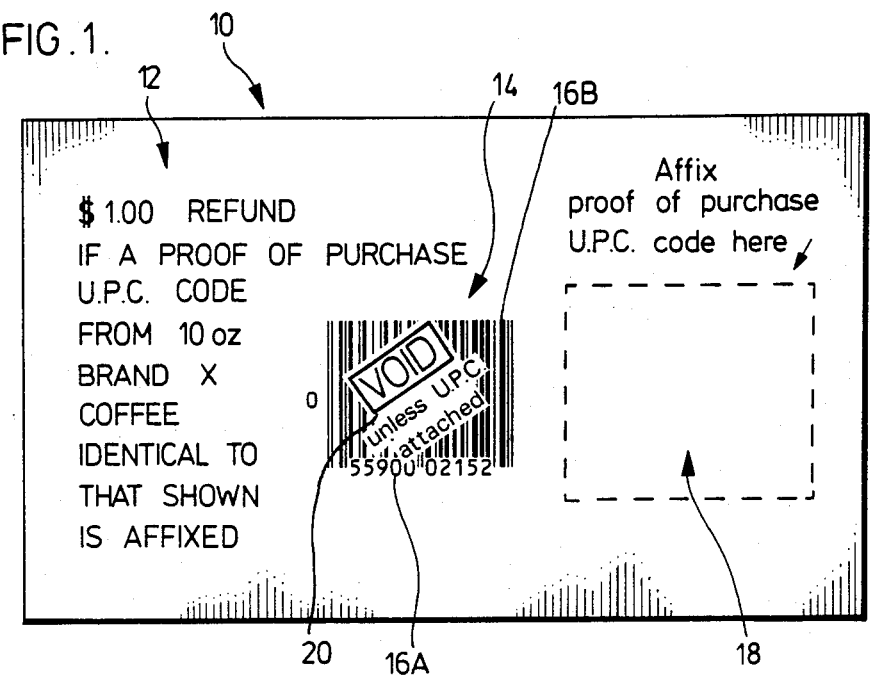
FIG. 1 is a plan view of a coupon in accordance with a first embodiment of this invention.

FIG. 1 shows a first embodiment of a refund coupon 10 in accordance with the present invention. As may be seen, the coupon comprises a card-like member which has written instructions 12 on its face. Instructions 12 indicate that if a UPC from a specific product is affixed to the coupon, then a refund of a predetermined value will be provided.

Coupon 10 includes identification or comparison indicia 16 namely printed material on its face which sets out the UPC code 16 for the specified product. As may be seen, the UPC 16 printed on coupon 10 in this first embodiment comprises both numerical characters comprising numeric code A and computer readable parallel line code B. Located on coupon 10 beside UPC 16 is a location indicia 18 which comprises markings delineating an area where a suitable UPC code is to be tendered as proof of purchase is to be affixed to the coupon. Location indicia 18 in FIG. 1 is located immediately beside UPC 16 of the identification indicia whereby upon a purchaser affixing a UPC from a purchased product to coupon 10 on the indicated location indicia 18, the close juxtaposition of UPC 16 and the UPC from the purchased product, permits ease of visual comparison to ascertain whether the two UPC's are the same. The UPC shown on any particular consumer product, as for example, all 10 ounce jars of Brand-X coffee will typically be of identical size. Preferable UPC 16 comprising the identification indicia 14 will be of identical size to that of the UPC actually shown on the product, thereby aiding visual identification.

As shown in FIG. 1, preferably UPC 16 comprising identification indicia will have a voiding marking 20 thereon so that the UPC 16 from one coupon could not merely be detached therefrom and tendered as a proof of purchase to validate other coupons.

Figure 2:
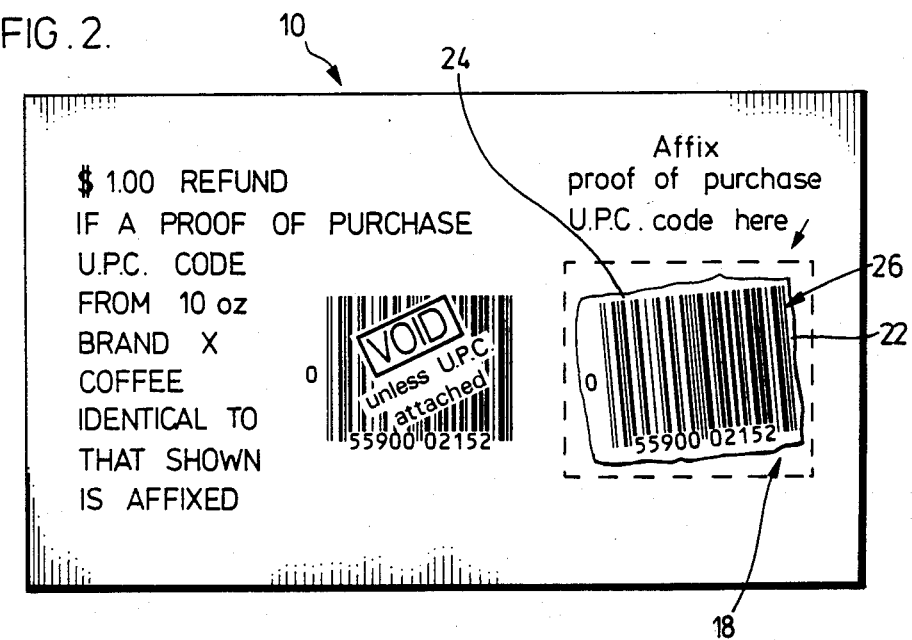
FIG. 2 is a plan view of the coupon of FIG. 1 with a proof of purchase affixed thereto.

FIG. 2 shows the coupon 10 from FIG. 1 after a proof-of-purchase portion 22 as detached from the packaging of a retail product and containing thereon the UPC code 26 from that product has been affixed to the coupon 10 over the location indicia 18, as, for example, by a staple not shown. FIG. 2 clearly shows the ease with which a cashier at a retail store may compare UPC 16 and UPC 26 to ensure they are the same.

Figure 3:
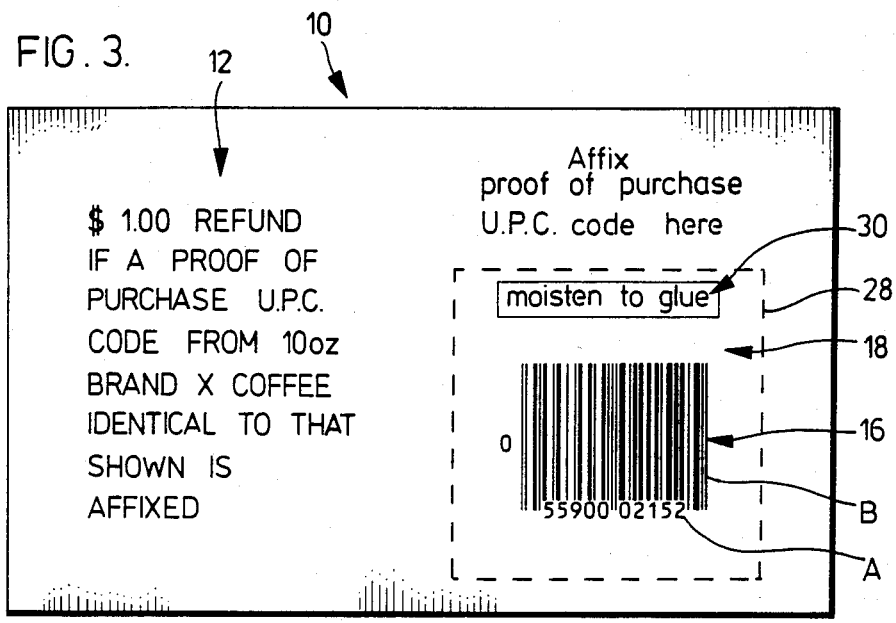
FIG. 3 is a plan view of a refund coupon in accordance with a second embodiment of the present invention.

FIG. 3 shows a second embodiment of a coupon 10 in accordance with the present invention. Coupon 10 of FIG. 3 contains written instructions 12 on its face similar to those of coupon 10. The identification indicia of coupon 10 also comprises an identification indicia comprising UPC 16. However, in FIG. 3 the location indicia 18, comprising dotted lines 28 demarking the area where a proof-of-purchase portion of a product package is to be affixed, surrounds and encompasses the identification indicia 16. In coupon 10 of FIG. 3 the proof-of-purchase UPC 26 from the product is to be affixed over top of UPC code 16 on coupon 10.

In use of coupon 10 of FIG. 3, the overlying positioning of identification indicia 16 and location indicia 18 is such that a portion of the proof-of-purchase product packaging containing UPC code 26 may be hingedly affixed over top of UPC 16. A cashier may then merely flip up the overlying product packaging so as to easily compare the two UPC's for verification of product purchase.

Coupon 10 of FIG. 3 also shows affixation means 30 comprising means whereby the product packaging portion containing the proof-of-purchase UPC may be affixed to coupon 10. In the coupon of FIG. 3, the affixation means 30 comprises an area which upon wetting becomes sticky as in the manner of water activated adhesives provided on the back of conventional postage stamps. Merely by moistening area 30, the proof-of-purchase portion of the product's packaging containing the UPC may be secured to coupon 10 within the confines of location indicia 18 and in such a manner that a proof-of-purchase UPC may be hinged upwardly so as to view the identification indicia UPC 16 for verification of proper purchase.

In each of the coupons 10 shown in FIGS. 1 and 3, the identification indicia 16 has consisted of a complete UPC comprising numeric code A and line code B. As the numeric code A is of primary importance in human visual comparison, the numeric code A may be provided by itself without the line code B. Preferably, the numeric code A may be shown more than once on a coupon. Preferably also the numeric code A may be shown in different orientations so as to facilitate comparison of the numeric codes of the UPC even if the proof-of-purchase UPC may not be orientated in a similar manner to the bulk of the printing provided on a coupon.

Figure 4:
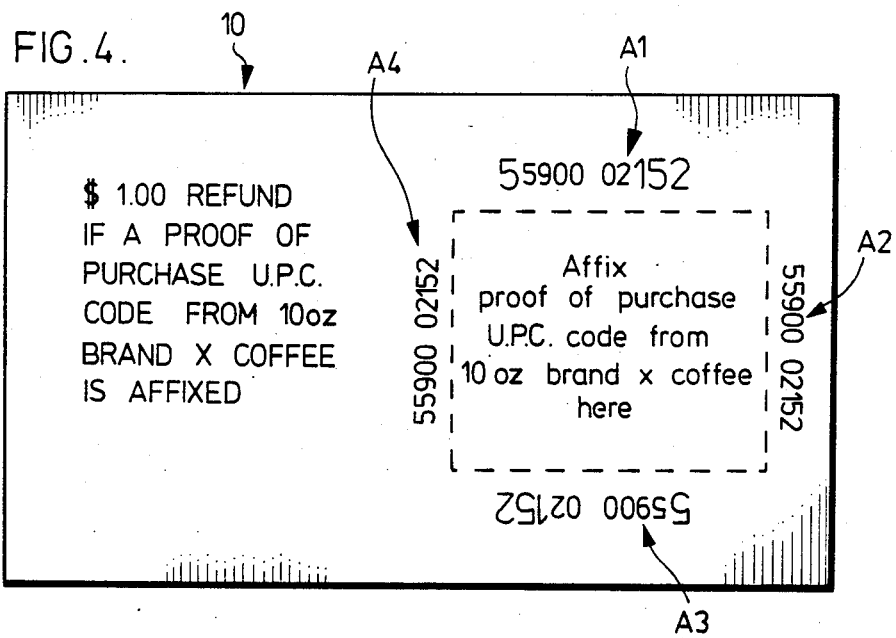
FIG. 4 is a plan view of a refund coupon in accordance with the third embodiment of the present invention.

FIG. 4 illustrates a coupon similar to the coupon shown in FIG. 3 with the exception that identification indicia 14 includes a plurality of numerical codes A1 to A4 provided about the demarked area of the location indicia 18, with each of numerical codes A1 to A4 in a different orientation. On securing a proof-of-purchase UPC inside the location indicia, numeric codes A1 to A4 can easily be compared with the numeric code on the proof-of-purchase UPC.

Another feature of the invention shown in FIG. 4 is the enhancement of characteristic numeric characters in the numeric code so as to facilitate recognition. The UPC comprises a plurality of numerals, different of which may indicate information such as the manufacturer, the product and the product size. By comparison of but a few characterizing numerical characters in the UPC, product verification may be substantially established. In FIG. 4, numerical characters A1 and A3 have been shown with the first character and the last three characters of increased size as compared to the remaining characters. Comparison of the enlarged last three characters may, for example, comprise satisfactory product purchase verification while reducing verification time and effort.

As an alternative to enlarging numeric characters, characterizing numerals could be enhanced in other manners as by colouring characterizing numerals a different colour from the remainder of the characters.

FIG. 4 has been shown with the central portion of the square substantially blank and not containing a complete UPC. As is to be appreciated, a complete UPC with numeric code and line code could be provided therein as in the case of FIG. 3.

The coupon of FIG. 1 does not provide any specific means for affixing the proof-of-purchase UPC to the coupon. A consumer would appreciate however that the proof of purchase may be affixed to a coupon of FIG. 1 by numerous conventional means, as for example, by a staple as shown in FIG. 2 and by means of glue or adhesive tape. Advantageously however, the coupon may inherently provide means to affix the proof of purchase thereto, as for example, in the case of FIG. 3 where an adhesive affixation means 30 is provided to be activated on moistening. Alternative to having an adhesive activated by moistening, a strip of adhesive could be provided on the coupon which adhesive while only to a small extent adhering to a removable cover, would be pressure sensitive and adhere to the packing material comprising the proof of purchase. Use of such an adhesive strip would comprise removal of the strip cover followed by pressing the proof-of-purchase portion of the product packaging onto the exposed strip to form a substantially unremovable bond therewith.

Figure 5:
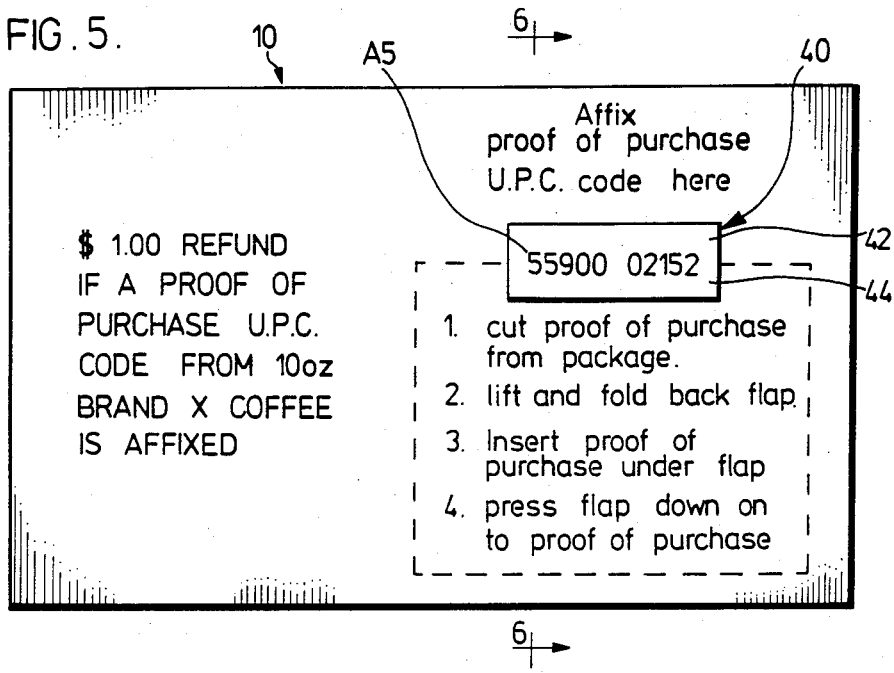
FIG. 5 is a plan view of a refund coupon in accordance with a fourth embodiment of the present invention.
Figure 6:
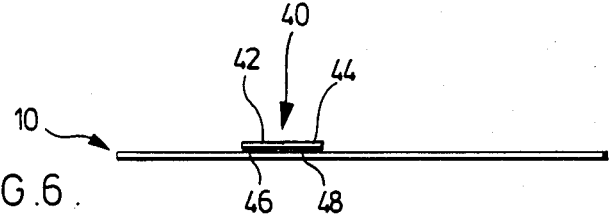
FIGS. 6, 7 and 8 are each schematic cross-sectional end views of the coupon shown in FIG. 5 along line V-V' with FIG. 6 showing the coupon in an unused position, FIG. 7 showing the coupon ready to receive a proof-of-purchase and FIG. 8 showing the coupon with the proof-of-purchase affixed thereto.

A preferred use of a pressure sensitive adhesive is shown in FIGS. 5 to 8. FIG. 5 shows a coupon similar to that in FIG. 3 but with a strip of material 40 secured to its top surface. As illustrated in FIG. 6, strip 40 has two portions, a first portion 42 and a second portion 44. The first portion 42 is unremovably secured to the coupon surface. This may be achieved by use of an adhesive 46 as shown or alternatively by other conventional means. The second portion 44 has a pressure sensitive adhesive 48 on its lower surface which adhesive is selected having regard to the nature of the surface of the coupon and the nature of the surface of a portion of a product packaging to comprise the proof-of-purchase, that the second portion 44 is easily removable from the surface of the coupon. However, once the portion of the packaging comprising the proof-of-purchase may be placed under the second portion, pressing the second portion down on the proof-of-purchase will substantially and removably secure the proof-of-purchase.

Figure 7:
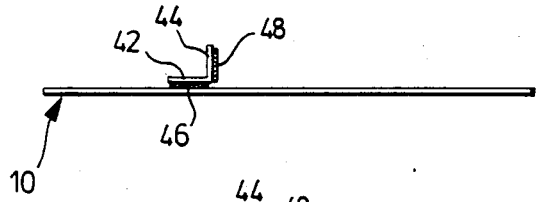
Figure 8:
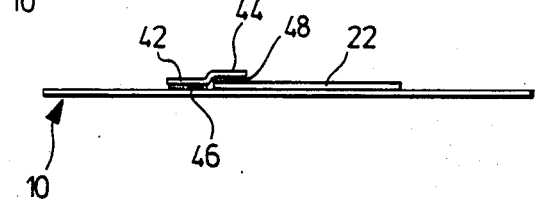

As shown in FIG. 7, the second portion may be detached from adhesion with the coupon surface and be hinged upwardly about a juncture between the first and second portion. Next, an edge of a proof-of-purchase product packaging portion 22 may be inserted under the second portion. Application of pressure to the second portion will cause the adhesive to form a substantially unremovable bond between the second portion 44 and the proof-of-purchase portion 22, providing a configuration as shown in FIG. 8.

To accomplish this desired result, two different adhesives could be used as adhesives 46 and 48, assuming the surface of the coupon is the same throughout. Further, the surface of the coupon may be chosen to be of a material which would be less firmly bonded to adhesive 48 then the material to comprise the proof-of-purchase 22.

Alternatively, the surface of the coupon below the second portion may be provided to have different, less adhesive properties compared to that of the remainder of the coupon and the proof-of-purchase so that the same adhesive may be used for 46 and 48 yet the second portion 44 would still be removable. This could be accomplished for example by placing a coating on the coupon below the second portion or by gluing a thin strip of material below the second portion, which coating or thin strip would easily permit the removal of the second portion therefrom.

The embodiment of FIG. 5 shows a combination of an affixation means and identification indicia. As shown in FIG. 5, numeric code 5A for the UPC is placed on top of strip 40. With a proof-of-purchase packaging portion retained by the second portion of the strip, the numeric code 5A on the strip 40 will always overlie the proof-of-purchase 22 and may easily be compared therewith.

FIGS. 9 and 10 illustrate another means for affixing the proof-of-purchase to a coupon. As shown in FIG. 9, cut lines 52, 54 and 56 are provided across the area defined by the location indicia. Lines 52 and 54 define a band 58. A proof-of-purchase may be slid under band 58 with one end thereof passing through slot 56. In this manner, as shown, in FIG. 10, a proof-of-purchase may be substantially retained in the coupon particularly where the coupon may be rather stiff and have an inherent resilience tending to bias band 58 to lie in a plane with the remainder of the coupon. The cut lines 52, 54 and 56 may be seen to comprise slots and could alternatively be provided by providing perforated lines which would release upon application of pressure. Many configurations of cut lines could be provided other than those shown which would provide essentially a band to substantially overlie a proof-of-purchase to retain the same on a coupon.

Advantageously, band 58 is provided with numeric code A6 thereon so that when a proof-of-purchase is inserted under the band, the numeric code A6 will always be visibly overlying the proof-of-purchase to facilitate comparison. Preferably also, the coupon shown in FIGS. 9 and 10 may be two sided with the numeric code A6 printed on both sides of the band so that the portion of the band overlying the proof-of-purchase will always display the numeric code.

Figure 11:
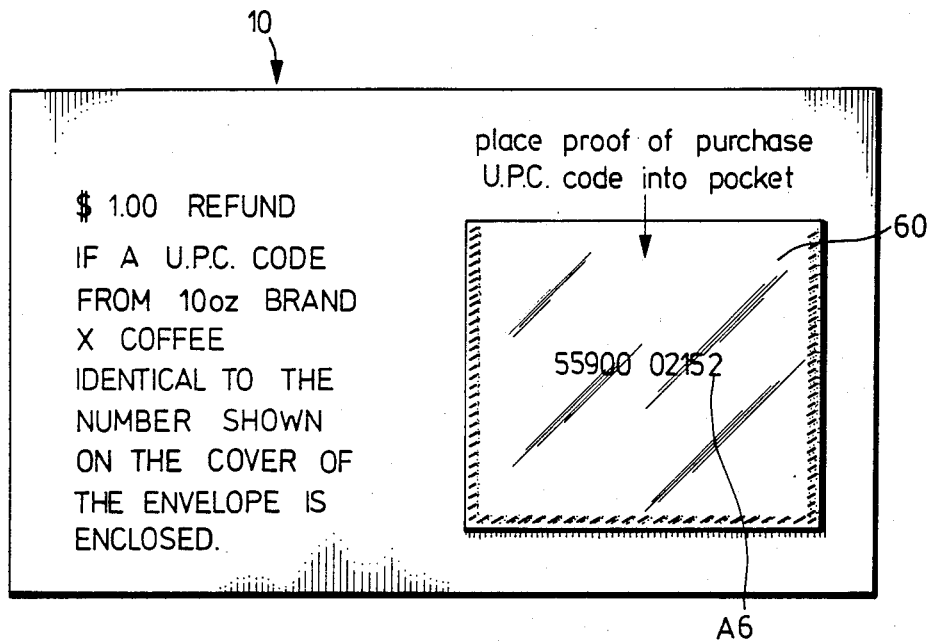
FIG. 11 is a plan view of a refund coupon in accordance with the sixth embodiment of the present invention.

FIG. 11 shows a further embodiment of a coupon in which a transparent pocket-like member 60 is provided on the face of the coupon 10 for insertion therein of a proof-of-purchase. The outer face of the transparent member 60 has a numeric code A7 thereon so as to provide an overlying numeric code for comparison when a proof-of-purchase has been inserted into the pocket.

While the invention of the present application as illustrated in the drawings has been used with a UPC code from a purchase product as a means of identification, the present invention envisions the use of other marking in substitution for the UPC code. For example, a manufacturer may decide to print a written description, logo or other graphic device on a convenient location on a product packaging. By detaching the design, logo or other graphic device from the packaging it may comprise a proof-of-purchase. An identical design, logo or graphic device may be provided as identification indicia on a coupon to facilitate verification of purchase as in the matter of use of the UPC specifically described above.

The invention of the present application also encompasses a method for manufacturing and using a refund coupon redeemable at a cash value at retail stores when a proof of purchase comprising a portion of a products packaging is affixed thereto. The method includes the steps of printing the necessary materials. This would involve the printing of product identification indicia on packaging associated with a given product. The printing would also involve the step of printing suitable coupons as described more specifically above which coupons would have both identification indicia corresponding to the given product as well as location indicia indicating a location on the coupon for affixation of a proof-of-purchase containing the product identification indicia.

Preferably the method would also include the step of providing means for fixedly mounting the proof-of-purchase comprising a portion of the products packaging onto the coupon at the indicated location.

Another step in the method involves the distribution of the product with its associated suitably marked packaging and the distribution of the coupons. Subsequently, the method involves the step of redeeming the discount coupons at retail stores upon verification at the retail store level that the coupon has been activated by affixation of a suitable portion of a products packaging containing the product identification indicia which corresponds to the coupon identification indicia.

An object of the present application is to display coupon identification indicia on a coupon proximate a location where a proof-of-purchase may be affixed so that, for example, a UPC comprising the coupon identification indicia may be verified as corresponding to a UPC code on a proof-of-purchase. One method of comparison comprises human comparison by the human eye. To facilitate human comparison, the proof of purchase may be located close to the UPC on the coupon. Another method of comparison comprises comparison of coupon identification indicia with indicia on a proof-of-purchase by a mechanical device such as an optical scanning machine. Thus, at a check-out station in a retail store which may be equipped with a reading machine the reading machine could be used to read both the coupon identification indicia on the coupon plus indicia marked on the proof-of-purchase applied to the coupon. Such a machine could be programmed to provide an output as to whether the proof-of-purchase indicia corresponds to that of the coupon identification indicia. It would be but a simple modification of an existing reading machine to carry out this function.

As a further variation, while not essential, the machine readable code comprising the coupon identification indicia could be chosen to be different than the machine readable indicia on the proof-of-purchase. In this case, it would be a simple matter for the machine on reading each of the two different identification indicias to be programmed so that it recognized the two indicia as corresponding. A further variation would be that the coupon identification indicia be recognized by the machine not only as identifying the particular product but also as instructing the machine that the next identification means to be read is to be compared. Thus it would be a simple matter for the coupon identification means to be read first thereby instructing the machine that it was to perform and report on a comparison of the next submitted product identification code. Of course, while the machine readable code on the coupon may be selected to be different than the machine readable code on the proof-of-purchase, in such a case it would be preferable that the numeric code as displayed on the coupon and proof of purchase remain the same so as to permit concurrent human varification.

Although the disclosure describes and illustrates preferred embodiments of the invention, it is to be understood that the invention is not limited to this particular embodiment. Many variations and modifications will now occur to those skilled in the art. For a definition of the invention, reference is made to the appended claims.

What I claim is:

1. A refund coupon redeemable at a cash value at retail stores when a proof-of-purchase portion of a given product packaging is affixed thereto, said coupon comprising in combination:
    (a) comparison indicia thereon corresponding substantially identically to product identification indicia provided on the proof-of-purchase portion of the product packaging,
    (b) location indicia thereon indicating a location on the coupon for affixation of the proof-of-purchase portion of the product packaging,
    said comparison indicia and said location being positioned on said coupon closely adjacent to each other to facilitate a visual comparison of the comparison indicia and the product identification indicia on the proof-of-purchase portion when the proof-of-purchase portion is affixed to the coupon on the location, and
    (c) means to affix said portion to said coupon on said location,
    said means to affix comprising:
    a strip having two portions, a first portion and a second portion;
    said first portion being fixedly secured to said coupon;
    said second portion coupled to said first portion and being removably secured to the coupon by a pressure sensitive adhesive on an underside of said second portion;
    whereby said second portion may be removed from adhesion with said coupon and upon insertion of said proof-of-purchase portion of a product packaging thereunder, said pressure-sensitive adhesive being adapted to form a substantially unremovable adhesion with said proof-of-purchase portion.

2. A refund coupon as claimed in claim 1 wherein said strip carries on an upper surface thereof said comparison indicia.

3. A refund coupon as claimed in claim 2 wherein said comparison indicia comprises a universal product code.

* * * * *